US008982994B2

(12) United States Patent
Egot et al.

(10) Patent No.: US 8,982,994 B2
(45) Date of Patent: Mar. 17, 2015

(54) PHASE-SHIFTING DEVICE FOR ANTENNA ARRAY

(75) Inventors: Mathieu Egot, Grenoble (FR); Jonathan Muller, Suisse (CH); Andreia Cathelin, Laval (FR); Didier Belot, Rives (FR)

(73) Assignee: STMicroelectronics SA, Montrouge (FR)

( * ) Notice: Subject to any disclaimer, the term of this patent is extended or adjusted under 35 U.S.C. 154(b) by 512 days.

(21) Appl. No.: 13/328,412

(22) Filed: Dec. 16, 2011

(65) Prior Publication Data

US 2012/0163425 A1 Jun. 28, 2012

(30) Foreign Application Priority Data

Dec. 23, 2010 (FR) ...................................... 10 61173

(51) Int. Cl.
*H04L 25/49* (2006.01)
*H01Q 3/26* (2006.01)

(52) U.S. Cl.
CPC ....................................... *H01Q 3/26* (2013.01)
USPC ........................................... 375/297; 375/219

(58) Field of Classification Search
CPC ...... H04B 1/0003; H04B 1/0007; H04B 1/28; H04B 7/0408; H04B 7/0413; H04B 7/0417; H04B 7/0617; H04B 7/086; H04L 27/3818
USPC .......................... 375/219, 295–299, 316, 327
See application file for complete search history.

(56) References Cited

U.S. PATENT DOCUMENTS

| | | | | |
|---|---|---|---|---|
| 5,764,187 | A * | 6/1998 | Rudish et al. | 342/372 |
| 2003/0202542 | A1* | 10/2003 | Page et al. | 370/508 |
| 2006/0178120 | A1* | 8/2006 | Puma | 455/114.3 |
| 2007/0142000 | A1* | 6/2007 | Herzinger | 455/91 |
| 2008/0001657 | A1* | 1/2008 | Zhang | 327/552 |
| 2010/0079347 | A1* | 4/2010 | Hayes et al. | 343/705 |
| 2010/0284495 | A1* | 11/2010 | Segal et al. | 375/316 |
| 2010/0289569 | A1* | 11/2010 | Honcharenko | 330/124 R |
| 2011/0310941 | A1* | 12/2011 | Kenington | 375/220 |

OTHER PUBLICATIONS

Cohen et al., "A thirty two element phased-array transceiver at 60Ghz with RF-IF conversion block in 90nm flip chip CMOS process," IEEE Radio Frequency Integrated Circuits Symposium, 2010, 4 pages.
Muller et al., "A FIR Baseband Filter for High Data Rate 60-GHz Wireless Communications," IEEE Xplore, Digital Library, STMicroelectronics—Crolles, University of California, Berkeley Wireless Research Center, Jun. 2010, 4 pages.

* cited by examiner

*Primary Examiner* — Shuwang Liu
*Assistant Examiner* — David S Huang
(74) *Attorney, Agent, or Firm* — Slater & Matsil, L.L.P.

(57) ABSTRACT

Device comprising processing means (MT), transmission channels (VE1, . . . VEn), an antenna array for transmitting signals comprising a number of antennas (A11 . . . A1*n*) respectively associated with the transmission channels, a number of digital-analog converters (DAC) and a number of phase-shifting means (MD1, . . . MDn) respectively associated with the antennas, said phase-shifting means (MD1, . . . MDn) being placed between the processing means (MT) and the digital-analog converters (DAC) and including digital all-pass filters of FIR type (PT), the processing means comprising control means (MC) configured to adjust the coefficients and/or the order of the all-pass filters of FIR type.

20 Claims, 3 Drawing Sheets

PHASE-SHIFTING DEVICE FOR ANTENNA ARRAY

CROSS-REFERENCE TO RELATED APPLICATION

This application claims the priority benefit of French patent application number 1061173, filed on Dec. 23, 2010, which is hereby incorporated by reference to the maximum extent allowable by law.

TECHNICAL FIELD

The invention relates to the transmission of signals, notably with wavelengths of the microwave, millimetric and TeraHertz type whose frequencies range respectively from 300 MHz to 30 GHz, from 30 GHz to 300 GHZ and from 300 GHz to 3 THz, and more particularly the antennas and their phase-shifters designed for such transmission.

The invention applies advantageously but in a non-limiting manner to the wireless electronic systems that can exchange such microwave, millimetric and TeraHertz wavelength signals. For example, this invention applies to the WirelessHD standard or to the WGig standard defined by the Wireless Gigabit Alliance group (using terms well known to those skilled in the art).

BACKGROUND

The WirelessHD standard uses the 60 GHz frequency with a very high bit rate (between 3 and 6 Gb/s) and over distances of 3 to 10 meters between two transmitters/receivers in which the nature of the path of the waves between these two elements may be line of sight (LOS) or non-line of sight (NLOS), to use acronyms well known to those skilled in the art. It is then necessary to use an antenna or an antenna array whose radiation pattern in transmission and reception can be oriented and to also have a system with a significant wireless transmission gain (or "air link gain" to use a term well known to those skilled in the art).

In practice, with an antenna array (a term well known to those skilled in the art), it is possible to obtain electronic pointing in a direction by applying to the signal intended for the antennas and/or received from the antennas, different delays or phase shifts. In practice, based on the different delays or phase shifts, it is possible to adjust the direction of the radiation pattern of the antenna array.

In the state of the art, it is known practice to phase shift the signal after a double upward frequency transposition has taken place by means of mixers and two local oscillators. The phase-shifting means are then arranged downstream of the two mixers.

It is also possible to apply different phase shifts to the signal obtained from the local oscillator which is used in the second upward frequency transposition. The phase-shifting means are then connected between the second mixers and the local oscillators.

According to another alternative, the phase shifts are produced on the signal after the first transposition. The phase-shifting means are then arranged between the first mixer and the second mixer.

In all these embodiments, the phase-shifting means used are discrete, that is to say that the phase shift or phase difference between the signal at the input and at the output of the phase shifter may take a number of finite values. For example, there are phase shifters that can apply a phase shift of 22.5°, 45°, 90°, and 180°. The use of discrete phase shifters does not make it possible to address all the directions with an antenna array. On the contrary, only a few directions can be addressed.

An example of this type of antenna array is illustrated in the publication entitled, "A Thirty-two element phased-array transceiver at 60 GHz with RF-IF conversion block in 90 nm flip chip CMOS process", by COHEN, E.; JAKOBSON, C.; RAVID, S.; RITTER, D.; in the Radio Frequency Integrated Circuit (RFIC), 2010 Congress, IEEE, pp. 457-460, dated 23 to 25 May 2010, incorporated herein by reference.

In this antenna array system, phase shifters with 4 phase-shifting levels are used, 32 antennas are used, the consumption reaches 500 mW and the size of the circuit reaches 14.5 $mm^2$.

SUMMARY OF THE INVENTION

In one aspect, embodiments of the present invention provide for a device comprising processing means, a plurality of transmission channels, an antenna array for transmitting signals comprising a plurality of transmission antennas respectively associated with the transmission channels. The device further includes a plurality of digital-analogue converters and a plurality of phase-shifting means respectively associated with the transmission antennas, the respective phase-shifting means being placed between the processing means and respective digital-analogue converters and including digital all-pass filters of FIR type. The processing means comprise control means configured to adjust at least one of the coefficients and the order of the digital all-pass filters of FIR type.

In another aspect, embodiments of the present invention provide for a device comprising a processor, a frequency generator and a plurality of transmission channels. Each transmission channel include a digital phase shifter having an input coupled to a respective output of the processor and having an output, the digital phase shifter including a plurality of digital all-pass FIR filter. At least one of a coefficient and an order of the digital all-pass FIR filters are adjusted by the processor. Each channel further includes a digital to analogue converter having an input coupled to the output of the digital phase shifter and having an output, a frequency transposition stage having a first input coupled to the output of the digital to analogue converter, having a second input coupled to the output of the frequency generator, and having an output, a power amplifier having an input coupled to an output of the frequency transposition stage and having an output, and an antenna coupled to the output of the power amplifier. The device further includes a reception channel comprising a reception antenna, a reception power amplifier coupled to an output of the reception antenna, a reception frequency transposition stage coupled to an output of the reception power amplifier, and a reception analogue to digital converter coupled to an output of the reception frequency transposition stage.

In yet another aspect, the present invention provides for a method comprising receiving a composite signal, dividing the composite signal into a plurality of signals, processing each signal in a respective transmission channel, and transmitting each processed signal by a respective transmission antenna. Processing each signal includes determining a desired phase shift for the signal, and passing the signal through at least one all-pass FIR filter to apply the determined phase shift to the signal.

BRIEF DESCRIPTION OF THE DRAWINGS

Other features and advantages of the invention will become apparent from studying the detailed description of implementations and embodiments, which are by no means limiting, and the appended drawings in which.

DETAILED DESCRIPTION OF ILLUSTRATIVE EMBODIMENTS

Figure 1:
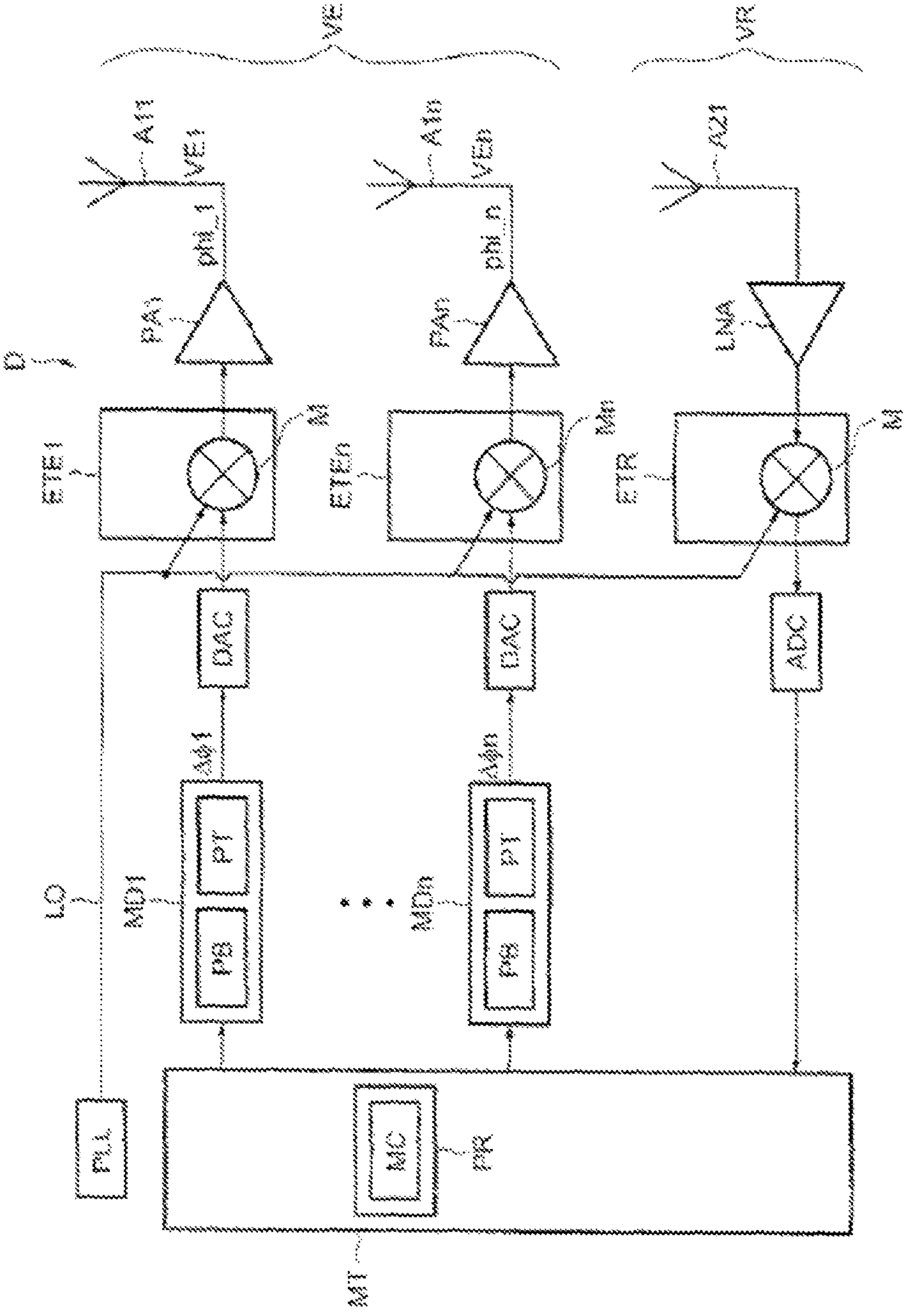
FIG. 1 schematically illustrates one embodiment of a device according to the invention.

Before discussing in detail the illustrated embodiments, various embodiments and advantages thereof will be discussed generally.

According to one embodiment, a device is proposed which is compatible, for example, with a WirelessHD wireless application, aiming to minimize or even completely overcome the abovementioned drawbacks while retaining a circuit of small size and a device that has a reasonable consumption.

According to one embodiment, a device is proposed which comprises processing means, transmission channels, an antenna array for transmitting signals comprising a number of antennas respectively associated with the transmission channels, a number of digital-analogue converters and a number of phase-shifting means respectively associated with the antennas, said phase-shifting means being placed between the processing means and the digital-analogue converters and including digital all-pass filters of FIR type, the processing means comprising control means configured to adjust the coefficients and/or the order of the all-pass filters of FIR type.

The use of the all-pass FIR filters for the phase-shifting allows, by an adjustment of the coefficients or else of the order of the filters, one to vary the phase continuously. Thus, all the directions within a predefined solid angle of the space can be pointed to electronically by the antenna array and no longer only a certain number of predefined angles.

Furthermore, the conventional RF (radio frequency) phase shifters may result in significant losses of the order of 5 to 10 dB. However, the all-pass filters of FIR type allow for a gain, which is also constant over the bandwidth of the system. Thus, the consumption is reduced and no equalization is necessary.

With CMOS technology and by using a single transmission channel, the constraints on the power amplifiers are very significant. To such an extent that multiple-stage amplifiers are needed whose efficiency and consumption are not satisfactory. The use of an antenna array makes it possible, by distributing the power over different channels (more specifically, by dividing up the power by as many transmission channels), to limit the constraints on the power amplifiers. Thus, with constant equivalent power, a set of amplifiers for a number of transmission channels consumes less than one amplifier for a single transmission channel.

The elimination of the losses mentioned above makes it possible not to have to compensate them with RF gain, the circuit requiring less amplification; its size can therefore be reduced.

Additionally, the use of a digital all-pass filter of FIR type in the digital stage allows for a greater phase-shifting accuracy for a number of reasons:

- in the digital domain, there are no longer phase accuracy errors that were possible with a radiofrequency (RF) analogue phase shifter,
- the filters induce a constant delay over the frequency band of interest and it is no longer necessary to make any approximation between the phase shift and the delay.

According to one embodiment, the device comprises at least one reception channel for receiving a signal, the control means being configured to adjust the coefficients and/or the order of the all-pass filters of FIR type on the basis of the signal received by said reception channel.

Thus, it is possible to adjust the coefficients and/or the order of the filters during, for example, a training sequence. This training sequence takes place at regular intervals or when necessary.

According to one embodiment, the digital all-pass filters of FIR type have an identical structure for all the channels.

Thus, the adjustment of the coefficients and/or of the order is faster, the calculations of the coefficients of each of the channels being similar.

According to one embodiment, the processing means comprise a base band processor and the device comprises a phase-locked loop delivering a frequency transposition signal and each transmission channel comprises, downstream of the digital-analogue converters:

- at least one frequency transposition stage comprising a mixer,
- a power amplifier,
- all the frequency transposition stages being connected to the output of said phase-locked loop.

Thus, for the generation of the transposition signal, the consumption for all the channels is equivalent to that for a single channel, a single phase-locked loop being used. In practice, even if, because of the separation of the signal toward a number of channels, the losses are greater, these losses are easily compensated by a higher gain within the phase-locked loop. This gain results in a consumption that is negligible compared to that of a phase-locked loop.

According to one embodiment, for each transmission antenna, the resultant phase shift on the antennas is the result of the sum of the following phase shifts:

- the analogue phase shift in the frequency transposition stage;
- the analogue phase shift of the transposition signal;
- the analogue phase shift of the part of the transmission channel situated downstream of the frequency transposition stage; and
- the digital phase shift of the phase shifting means;
- the phase-shifting means being configured to apply a phase shift so that the resultant phase shift on each transmission antenna increases by a fixed increment from one transmission channel to another starting from a first transmission channel, this fixed increment being equal to the resultant phase shift on the antenna of said first transmission channel.

It is thus possible to continuously electronically point to a number of directions by adjusting the digital phase shifts. In practice, for an electronic pointing, phase shifts are generally used on the transmission channels, at the level of the antennas, which are such that the phase-shift difference between one channel and the next is always equal to the same value. Furthermore, it is not necessary to calculate the so-called analogue phase shifts to change the direction.

According to one embodiment, the analogue phase shifts have a controllable part and the control means are configured to control the controllable part of all the analogue phase shifts so that the resultant phase shift on each transmission antenna increases by a fixed increment from one transmission channel to another starting from a first transmission channel, this fixed increment being equal to the resultant phase shift on the antenna of said first transmission channel.

Thus, for the resultant phase shift, the accuracy of the digital phase shifts is still obtained while producing a part of the phase shift on the analogue part.

According to another embodiment, the phase-shifting means also comprise low-pass digital filters of FIR type.

It is thus possible to select the useful signal using another filter of FIR type having an improved accuracy and consumption.

According to one embodiment, the phase-shifting means comprise:

at least one first group of filters comprising an all-pass filter of FIR type and, possibly, a low-pass filter of FIR type, at least one second group of filters comprising another all-pass filter of FIR type and, possibly, another low-pass filter of FIR type, said groups being identical for all the transmission channels of the antennas.

The calculation of the coefficients therefore does not have to be repeated for each of the transmission channels, these transmission channels using the same filters.

According to one embodiment, the phase-shifting means also comprise a demultiplexer and a multiplexer, the first and second groups of filters being respectively connected to two inputs of the multiplexer and to two outputs of the demultiplexer, the control means being configured to generate a control signal intended to control the demultiplexer and the multiplexers so that the phase-shifting means can all apply a phase shift derived either from the first group of filters or from the second group of filters, the phase-shifting means comprising an identical number of first and second groups of filters, this number being identical from one channel to another and the number of groups of filters selected on each channel depends on the desired transmission half-space.

Given the summing of the phase shifts when the groups of filters are placed one after the other, a constant difference is obtained between each channel by increasing, with a regular pace, the number of filters on each channel. This makes it possible, by choosing components (power amplifier, mixer and phase-locked loop) which apply negligible analogue phase-shifts or by compensating the analogue phase-shifts by means, for example, of another FIR filter in the phase-shifting means, to obtain, on the antennas, resultant phase shifts which are such that the phase-shift difference between one channel and the next is always equal to the same value.

It is thus possible, by virtue of the rapid switchover from one phase shift to another within the phase-shifting means, to switch from one transmission direction to another.

According to one embodiment, the signals from the antenna array have a microwave, millimetric or TeraHertz type wavelength.

FIG. 1 shows a device D which uses all-pass filters. An all-pass filter is a filter which applies to a signal passing through it a substantially identical gain over all the frequencies of the spectrum of this signal. On the other hand, it applies a phase shift $\phi$ which is variable for the frequencies of the spectrum of this signal.

The device D comprises a number of transmission channels VE1 . . . VEn and, in the example represented, one reception channel VR. These channels are linked to processing means MT.

The processing means comprise a base band processor PR, control means MC implemented, for example, in the form of a software module within the processor PR. In another embodiment, the control means could be implemented in special purpose or general purpose hardware, or could be implemented as a combination of hardware and software, e.g., firmware. Likewise, base band processor PR can be implemented as special purpose hardware, implemented on general purpose hardware running appropriate command sequences, or a combination of hardware and software. The device D also comprises a phase-locked loop PLL delivering a frequency transposition signal LO (local oscillator signal).

The processing means MT are capable of processing a signal to be transmitted by the transmission channels or received by the reception channel.

The reception channel VR comprises an antenna A21, a low noise amplifier LNA, a frequency transposition stage ETR and an analogue-digital converter ADC.

The frequency transposition stage ETR comprises a mixer M receiving the local oscillator signal or transposition signal LO delivered by the phase-locked loop PLL. As an example of embodiment, the ETR stage allows for a transposition in the 0-10 GHz band of the signal received by the antenna A21 centered around the 60 GHz frequency.

The transmission channels respectively comprise:

- phase-shifting means MD1 . . . MDn which comprise an all-pass filter PT and, optionally, a low-pass filter PB, both of FIR type (FIR standing for Finite Impulse Response, a term well known to those skilled in the art),
- a digital-analogue converter DAC,
- a frequency transposition stage ETE1 . . . ETEn which is, according to a preferential embodiment, identical to the reception transposition stage ETR. As an example of embodiment, the stage ETE1 . . . ETEn allows for a transposition of the output signal from the digital-analogue converter of between 0 and 10 GHz, at the 60 GHz frequency,
- a power amplifier PA1 . . . Pan,
- an antenna A11, A12 . . . A1$n$.

According to a preferential embodiment, the means and elements of the transmission channels all have identical structures.

As an example of embodiment, the antennas A11, A21 . . . A1$n$ and A21 of the antenna array are of planar type.

As can be seen, the phase-shifting is done in the digital domain upstream of the DAC converter by virtue of the FIR filters.

The coefficients and the order of the low-pass FIR type filters PB are calculated so as to eliminate the unwanted signal. They are therefore calculated according to the communication standard that will be used. In the case of the WirelessHD standard, it is possible, in the case of a heterodyne structure, to use, for example, a low-pass filter with a cut-off frequency at 3 dB equal to 2 GHz (or all the bandwidth of the RF signal to be transmitted) or, in the homodyne case, to use, for example, a low-pass filter with a cut-off frequency at 3 dB equal to 1 GHz (or half the bandwidth of the RF signal to be transmitted). The coefficients are therefore generally fixed for a given use. That said, this cut-off frequency can vary according to the different applications targeted relative to the WirelessHD standard, so it is then advantageous to be able to adjust the coefficients of the low-pass filters.

To speed up the digital filtering and lower the consumption of the low-pass filter, it is possible to choose a filter of FIR type of a slightly higher order. In practice, for the FIR digital filters, the filtering time depends on the order. It is possible, by using a selection algorithm, called genetic, well known to those skilled in the art, to obtain, from a sample of slightly higher order filters, a filter that has a frequency response close to that of a filter that has a higher order. For more information, those skilled in the art can refer to the publication by Jonathan MULLER et al. published in June 2010 on the occasion of the IEEE International Symposium on Circuits and Systems (ISCAS) and entitled: A FIR BASEBAND FILTER FOR HIGH DATA RATE 60 GHz WIRELESS COMMUNICATION. Said publication, and in particular chapters II and IV, is for entirely useful purposes incorporated by reference in the present patent application.

According to a preferential embodiment, the coefficients of the all-pass filters PT are not fixed. The control means MC can then adjust the coefficients of the all-pass FIR filters. Thus, it is possible to scan different directions. As a variant, the coefficients of the all-pass filters PT can also be fixed; the transmission direction is then fixed.

In other words, the filters of FIR type PT and PB have two roles: the first, PT, are used to apply a phase shift so as to scan different directions with the transmission channels of the antenna array; the second, PB, are used to eliminate the unwanted signal according to the application and the standard used; they also provoke a phase shift.

According to a preferential embodiment, the adjustment of the coefficients of the all-pass FIR filters PT is done according to the signal received by the return channel. The adjustment according to the return channel may, as an example of embodiment, be done with a counterpart device of the device D. The counterpart device receives the signals transmitted by the device and transmits on the 60 GHz frequency signals which are notably received on the return channel VR of the device. A training sequence can be used. During this, a number of phase shifts and transmission amplitudes are tested, the result of the tests is known to the device D by virtue of the signal received on the return channel. To test the different phase shifts and amplitudes, an adjustment of the coefficients of the all-pass FIR filters PT is done by the control means MC. The use of the training sequence may, according to a first embodiment, be programmed by the processing means MT at regular intervals, for example every 5 ms. The use of the training sequence may, according to a second embodiment, be programmed by the processing means MT when necessary, for example, when the pilot frequencies are degraded.

In other words, the control means adjust the coefficients of the FIR filters according to the return channel. These adjustments set the phase shift and the gain of each of the filters PT.

In the WirelessHD standard, two communication modes coexist between two communicating systems: the so-called HRP (High Bit Rate Protocol) mode and the so-called LRP (Low Bit Rate Protocol) mode, to use terms well known to those skilled in the art. It is possible, advantageously, to use the LRP protocol for the return channel and the adjustment of the coefficients and the HRP protocol to transmit the useful data after the adjustment.

The adjustment of the coefficients of an all-pass digital filter of FIR type to increase or reduce the phase shift and the gain is known as such to those skilled in the art. During this adjustment, the phase shift can be increased or reduced continuously, that is to say, non-discretely.

It is also possible, according to a preferential embodiment, for the control means MC to be able to switch off some of the transmission channels so as to increase the transmission pattern resulting from the antenna array.

FIG. 1 also shows phase shifts phi_1 . . . phi_n which are the resulting phase shifts on each antenna. They correspond, for each transmission channel, to the sum of the phase shifts of the RF part of the transmission channel (that is to say, downstream of the frequency transposition stage), of the LO signal, in the frequency transposition stage for example in the mixer M1 . . . Mn and of the phase-shifting means MD1, . . . MDn. In other words:

$$phi\_1 = phi\_RF1 + phi\_M1 + phi\_LO1 + \Delta\phi 1$$

With phi_RF1 being the phase shift of the RF part of the first transmission channel VE1, for example applied by the power amplifier PA1 associated with the first transmission channel.

With phi_M1 being the phase shift applied in the frequency transposition stage ETE1 for example in the mixer M1.

With phi_LO1 being the phase shift of the LO signal connected to the mixer M1.

With Δϕ1 being the phase shift applied by the phase-shifting means MD1.

$$phi\_n = phi\_RFn + phi\_Mn + phi\_LOn + \Delta\phi n$$

With phi_RFn being the phase shift of the RF part of the nth transmission channel VEn, for example applied by the power amplifier PAn associated with the nth transmission channel.

With phi_Mn being the phase shift applied in the frequency transposition stage ETEn for example in the mixer Mn.

With phi_LOn being the phase shift of the LO signal connected to the mixer Mn.

With Δϕn being the phase shift applied by the phase-shifting means MDn.

For electronic pointing, the phase shifts phi_1 . . . phi_n observe the following condition:

$$phi\_1 = K,\ phi\_2 = 2*K,\ phi\_3 = 3*K \ldots phi\_n = n*K \quad (1)$$

K being the value of the increment corresponding to the direction pointed to.

In other words, the phase shifts on each antenna increase from one transmission channel to another by a fixed increment which is equal to the phase shift on the first antenna.

According to a first embodiment, the analogue phase shifts phi_Mn, phi_LO, phi_RFn are not controlled. The digital phase shifts Δϕn applied by the phase-shifting means MDn are adjusted so that the condition (1) is satisfied.

Thus, the phase shifts Δϕn have the following values:

- Δϕ1=Δϕ_init−SOM1, in which SOM1 is equal to the sum of the analogue phase shifts for the transmission channel VE1, (SOM1=phi_RF1+phi_M1+phi_LO1) and in which Δϕ_init is the phase shift which is applied by the phase-shifting means MD1 by adjusting the coefficients and the order of the all-pass filter PT in the phase-shifting means MD1. This phase shift Δϕ_init corresponds to the electronic direction pointed to. There is also Δϕ_init=phi_1=K.
- Δϕn=n*Δϕ_init−SOMn, with SOMn being equal to the sum of the analogue phase shifts for the transmission channel VEn (SOMn=phi_RFn+phi_Mn+phi_LOn).

To perform the adjustment, it is not necessary to compute the analogue phase shifts. This adjustment of the digital phase shifts Δϕn is performed, for example, on the basis of the signal received on the return channel resulting from the training sequence transmission.

According to a second embodiment, the analogue phase shifts in the frequency transposition stage, of the local oscillator signal LO, and of the RF part of the transmission channel VEn are controlled by the control means MC, for example by using delay lines. That said, it is not possible to precisely control these analogue phase shifts which retain a spurious portion. This spurious portion can easily be compensated by the phase-shifting means MD1 . . . MDn as was explained for the first embodiment.

In this second embodiment, for the condition (1) above to be satisfied, the controllable part of all the analogue phase shifts as well as the digital phase shifts are controlled.

This makes it possible to limit the digital phase shift applied by the phase-shifting means MDn.

In both embodiments, by adjusting the coefficients or the order of each all-pass FIR filter PT of the phase-shifting means MDn, the increment $\Delta\phi$_init is varied continuously so as to change the electronic direction pointed to.

Figure 2:
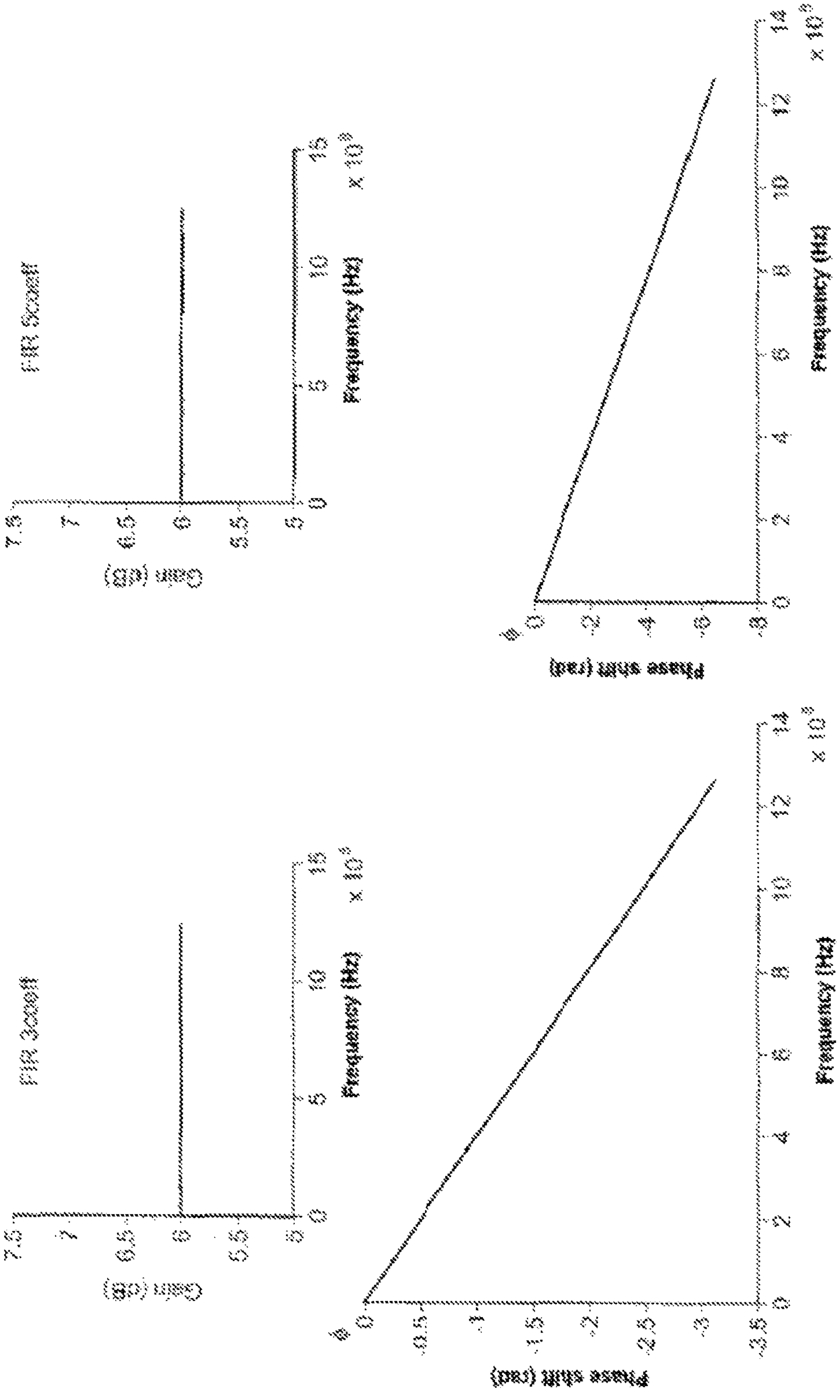
FIG. 2 schematically illustrates an example of the transfer function of an FIR filter with 3 or 5 coefficients.

FIG. 2 represents the curves of gain as a function of frequency and of the phase shift as a function of frequency for two all-pass filters of FIR type with two different orders: one with 3 coefficients and the other with 5 coefficients. These all-pass filters could be used in the phase-shifting means of the transmission and reception device according to the invention represented in FIG. 1.

The filter with 3 coefficients exhibits a constant gain of 6 dB in the 0-15 GHz band. Moreover, the phase shift that it applies increases proportionally in the band between 0 and 12 GHz to reach −3.14 rad at 12 GHz. The filter with 5 coefficients exhibits a constant gain of 6 dB in the 0-15 GHz band. Moreover, the phase shift that it applies increases proportionally in the band between 0 and 12 GHz to reach −6.28 rad at 12 GHz.

For each of these two filters, the slope as a function of the frequency of the phase shift represents the delay induced by each of the all-pass FIR filters, which is explained by the formula:

$$\Delta\tau = \frac{\phi}{f}$$

with $\phi$ representing the phase shift applied, for example −3.14 rad for the filter with 3 coefficients and f the corresponding frequency, for example 12 GHz. This delay is identical over the 0-15 GHz frequency range for each of the two filters, the delay induced by the filter with 5 coefficients being twice that of the filter with 3 coefficients.

In other words, unlike in the conventional phase-shifting means, the all-pass filters of FIR type make it possible to control the delay. This is advantageous because, to control the direction of the radiation pattern of an antenna array it is in fact the delay that has to be controlled. That was possible hitherto in the state of the art by using phase shifters applying a constant phase shift and for which the induced delay is then substantially constant for frequencies that vary little. However, this constant delay was only an approximation. By contrast, by virtue of the use of the all-pass filter of FIR type, the delay is constant by construction.

It is found that, by changing the order of a filter PT, the phase shift applied also changes. This adjustment can be continuous since it depends on the slope as a function of the frequency of the phase shift which itself depends on the coefficients and on the order.

Figure 3:
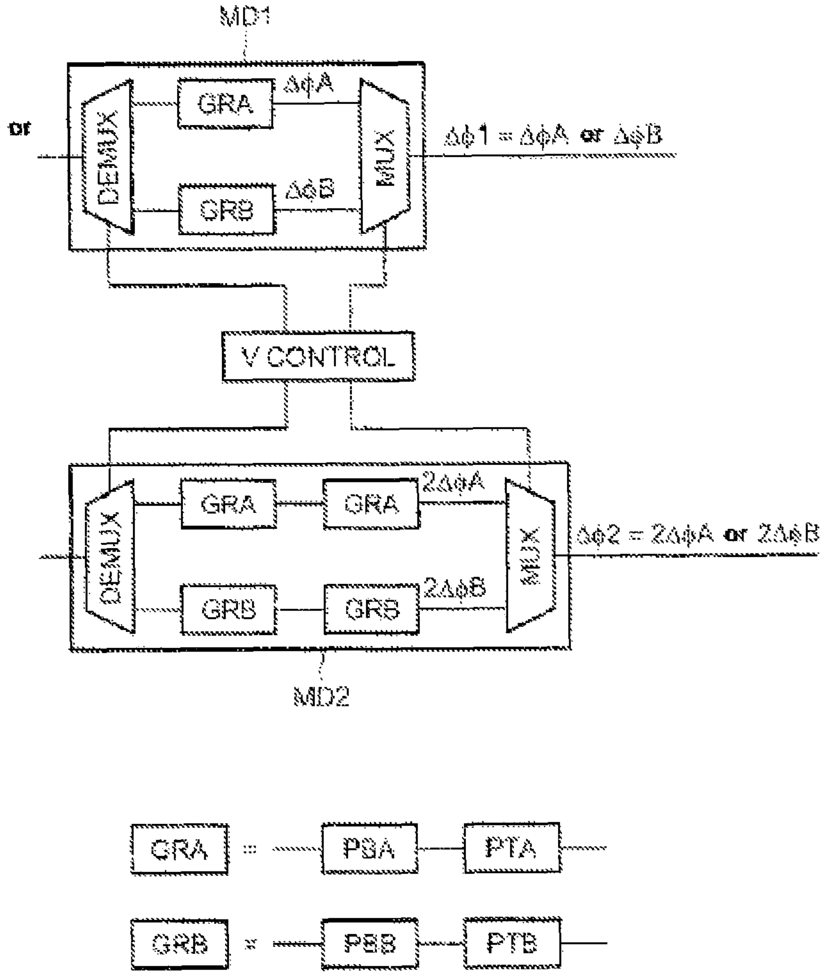
FIG. 3 illustrates a use of groups of filters in the phase-shifting means.

FIG. 3 illustrates a preferential embodiment of the phase-shifting means.

The phase-shifting means MD comprise a first one-to-two demultiplexer DEMUX. The demultiplexer DEMUX uses a control signal VCONTROL to switch the signal from the processing means MT to a first branch comprising a group of FIR filters GRA or a second branch comprising a group of FIR filters GRB.

The phase-shifting means also comprise a two-to-one multiplexer MUX. The multiplexer MUX uses the control signal VCONTROL delivered by the control means MC to switch the signal from the first branch or from the second branch to the digital-analogue converter DAC.

The group of filters GRA consists, as an exemplary embodiment, of a low-pass filter PBA of FIR type and an all-pass filter PTA of FIR type. That said, the group of filters GRA could comprise one or more filters PTA with or without a low-pass filter PBA.

The group of filters GRB consists, as an exemplary embodiment, of a low-pass filter PBB of FIR type and an all-pass filter PTB of FIR type. That said, the group of filters GRB could comprise one or more filters PTB with or without a low-pass filter PBB.

The composition of the groups of filters GRA and GRB is not necessarily identical. It is simply preferable for each of the two groups to apply a different phase shift.

The phase-shifting means MD of a transmission channel comprise the same number of groups GRA and GRB. From one transmission channel to another, the number of groups of filters GRA and GRB of the phase-shifting means is identical but some of the filters are selectively deactivated according to the desired transmission half-space.

As an exemplary embodiment, if the antenna array comprises four transmission channels, then the phase-shifting means of each transmission channel comprise four groups GRA and four groups GRB. To transmit in a first half-space, one group GRA and one group GRB are selected on the first transmission channel (only the selected groups in the phase-shifting means MD1 have been represented in FIG. 3), two groups GRA and two groups GRB are selected on the second transmission channel (only the selected groups in the phase-shifting means MD have been represented in FIG. 3), three groups GRA and three groups GRB are selected on the third transmission channel and four groups GRA and four groups GRB are selected on the fourth transmission channel. For simplicity in FIG. 3, the groups selected on the channels 3 and 4 have not been represented.

Thus, the phase-shifting means apply to the first transmission channel a phase shift $\Delta\phi 1=\Delta\phi A$ or $\Delta\phi B$ according to the signal VCONTROL. The phase-shifting means apply to the second transmission channel a phase shift $\Delta\phi 2=2*\Delta\phi A$ or $2*\Delta\phi B$ according to the signal VCONTROL. The phase-shifting means apply to the third transmission channel a phase shift $\Delta\phi 3=3*\Delta\phi A$ or $3*\Delta\phi B$ according to the signal VCONTROL. The phase-shifting means apply to the fourth transmission channel a phase shift $\Delta\phi 4=4*\Delta\phi A$ or $4*\Delta\phi B$ according to the signal VCONTROL.

If the aim is to transmit in the other half-space, four groups GRA and four groups GRB are selected on the first channel, three groups GRA and three groups GRB are selected on the second channel, two groups GRA and two groups GRB are selected on the third channel and one group GRA and one group GRB are selected on the fourth channel.

To allow the condition (1) stated above to be observed, it is possible, for example, to provide an additional FIR filter within the phase-shifting means MD1 . . . MDn so as to compensate for the analogue phase shifts for each channel SOM_n as explained above.

In both embodiments, an incrementation of the phase shift is obtained that makes it possible to point to an electronic direction as specified in FIG. 1, the change of direction being able to be performed as quickly as the switchover of the demultiplexers and of the multiplexers.

The resulting phase shifts, on each antenna phi_1 . . . phi_n, are controlled with a reduced amount of computation of the coefficients of the FIR filters since only the coefficients of the all-pass filters of the group GRA and of the group GRB and of one FIR filter by means of phase-shifting means MDn need to be computed for each direction.

Obviously, it is also possible to use multiplexers and demultiplexers with more than two inputs/outputs.

What is claimed is:

1. A device comprising:

a processor;

a plurality of transmission channels;

an antenna array for transmitting signals comprising a plurality of transmission antennas respectively associated with the plurality of transmission channels;

a plurality of digital-analog converters; and a plurality of phase-shifters respectively associated with the transmission antennas, the respective phase-shifters being placed between the processor and respective digital-analog converters, the respective phase-shifters including digital all-pass filters of FIR type and digital low-pass filters of FIR type, the processor comprising a controller configured to adjust at least one of the coefficients and the order of the digital all-pass filters of FIR type.

2. The device according to claim 1, further comprising at least one reception channel for receiving a signal, the controller being configured to adjust at least one of the coefficients and the order of the digital all-pass filters of FIR type according to a signal received by said reception channel.

3. The device according to claim 1, wherein the respective digital all-pass filters of FIR type have a substantially identical structure for all the channels.

4. The device according to claim 1, wherein the the processor further comprises a base band processor and the device further comprises a phase-locked loop delivering a frequency transposition signal and each transmission channel comprises, downstream of the respective digital-analog converters:

at least one frequency transposition stage comprising a mixer; and a power amplifier, all the frequency transposition stages being connected to an output of said phase-locked loop.

5. The device according to claim 1, in which the signals have a wavelength of microwave, millimetric or TeraHertz type.

6. A device comprising:

a processor;

a plurality of transmission channels;

an antenna array for transmitting signals comprising a plurality of transmission antennas respectively associated with the plurality of transmission channels;

a plurality of digital-analog converters; and a plurality of phase-shifters respectively associated with the transmission antennas, the respective phase-shifters being placed between the processor and respective digital-analog converters, the respective phase-shifters including digital all-pass filters of FIR type and digital low-pass filters of FIR type, the processor comprising a controller configured to adjust at least one of the coefficients and the order of the digital all-pass filters of FIR type, the processor further comprises a base band processor and the device further comprises a phase-locked loop delivering a frequency transposition signal and each transmission channel comprises, downstream of the respective digital-analog converters:

at least one frequency transposition stage comprising a mixer; and a power amplifier, all the frequency transposition stages being connected to an output of said phase-locked loop, wherein for each transmission antenna, a resultant phase shift on the transmission antenna is the result of the sum of the following phase shifts:

an analog phase shift in the frequency transposition stage;

an analog phase shift of the frequency transposition signal;

an analog phase shift of a part of the transmission channel situated downstream of the frequency transposition stage; and a digital phase shift of the phase-shifters, the phase-shifters being configured to apply a phase-shift so that a resultant phase shift on each transmission antenna increases by a fixed increment from one transmission channel to another starting from a first transmission channel, the fixed increment being equal to the resultant phase shift on the transmission antenna of said first transmission channel.

7. The device according to claim 6, wherein the analog phase shifts have a controllable part and the controller is configured to control the controllable part of the analog phase shifts so that the resultant phase shift on each transmission antenna increases by a fixed increment from one transmission channel to another starting from a first transmission channel, this fixed increment being equal to the resultant phase shift on the transmission antenna of said first transmission channel.

8. A device comprising processing means, a plurality of transmission channels, an antenna array for transmitting signals comprising a plurality of transmission antennas respectively associated with the transmission channels, a plurality of digital-analog converters and a plurality of phase-shifting means respectively associated with the transmission antennas, respective phase-shifting means being placed between the processing means and respective digital-analog converters and including digital all-pass filters of FIR type and low-pass digital filters of FIR type, the processing means comprising control means configured to adjust at least one of the coefficients and the order of the digital all-pass filters of FIR type.

9. A device comprising:

a processor;

a plurality of transmission channels;

an antenna array for transmitting signals comprising a plurality of transmission antennas respectively associated with the plurality of transmission channels;

a plurality of digital-analog converters; and a plurality of phase-shifters respectively associated with the transmission antennas, the respective phase-shifters being placed between the processor and respective digital-analog converters, the respective phase-shifters including digital all-pass filters of FIR type and digital low-pass filters of FIR type, the processor comprising a controller configured to adjust at least one of the coefficients and the order of the digital all-pass filters of FIR type, wherein the respective phase-shifters comprise:

at least one first group of filters comprising an all-pass filter of FIR type, at least one second group of filters comprising another all-pass filter of FIR type, each of said at least one first group of filters being substantially identical for all the transmission channels of the transmission antennas and each of said at least one second group of filters being identical for all the transmission channels of the transmissions antennas.

10. The device according to claim 9, wherein the at least one first group of filters further comprises a low-pass filter of FIR type, and the at least one second group of filters further comprises another low-pass filter of FIR type.

11. The device according to claim 9, wherein the respective phase-shifters also comprise a demultiplexer and a multiplexer, the first and second groups of filters being respectively connected to two inputs of the multiplexer and to two outputs of the demultiplexer, the controller being configured to generate a control signal intended to control the demultiplexer and the multiplexers so that the respective phase-shifters can all apply a phase shift derived either from the first group of filters or from the second group of filters, the respective phase-shifters comprising an identical number of first and second groups of filters, this number being identical from one channel to another, and the plurality of groups of filters selected on each channel depending on the desired transmission half-space.

12. A device comprising:

a processor;

a frequency generator;

a plurality of transmission channels, each transmission channel including:

a digital phase shifter having an input coupled to a respective output of the processor and having an output, the digital phase shifter including a plurality of digital all-pass FIR filters, and wherein at least one of a coefficient and an order of the digital all-pass FIR filters are adjusted by the processor;

a digital to analog converter having an input coupled to the output of the digital phase shifter and having an output;

a frequency transposition stage having a first input coupled to the output of the digital to analog converter, having a second input coupled to the output of the frequency generator, and having an output;

a power amplifier having an input coupled to an output of the frequency transposition stage and having an output; and an antenna coupled to the output of the power amplifier, wherein the digital phase shifter is configured to apply a phase shift to a received signal, the phase shift being adjusted to compensate for a phase shift applied to the channel by other components of the respective transmission channel.

13. The device of claim 12, wherein the frequency generator is a phase locked loop.

14. The device of claim 12, wherein the antennas of the plurality of transmission channels are configured as an antenna array.

15. The device of claim 12, wherein the applied phase shift increases by a fixed increment from a first transmission channel to a next transmission channel, the fixed increment being equal to a phase shift imposed by components of the first transmission channel.

16. The device of claim 12 further comprising:

a reception channel comprising:

a reception antenna;

a reception power amplifier coupled to an output of the reception antenna;

a reception frequency transposition stage coupled to an output of the reception power amplifier; and a reception analog to digital converter coupled to an output of the reception frequency transposition stage.

17. A method comprising:

receiving a composite signal;

dividing the composite signal into a plurality of signals, processing each signal in a respective transmission channel, and transmitting each processed signal by a respective transmission antenna;

wherein processing each signal includes:

determining a desired phase shift for the signal, wherein the desired phase shift for a given channel deviates from a desired phase shift for a prior channel by a fixed increment, the fixed increment being equal to the desired phase shift for a first one of the respective transmission channels; and passing the signal through at least one all-pass FIR filter to apply the determined phase shift to the signal.

18. A method comprising:

receiving a composite signal;

dividing the composite signal into a plurality of signals, processing each signal in a respective transmission channel, and transmitting each processed signal by a respective transmission antenna;

wherein processing each signal includes:

determining a desired phase shift for the signal, wherein determining a desired phase shift includes compensating for a phase shift imposed by analog components of the respective transmission channels; and passing the signal through at least one all-pass FIR filter to apply the determined phase shift to the signal.

19. The method of claim 18, wherein determining a desired phase shift for the signal includes receiving a training signal transmitted from a remote device and determining the desired phase shift from the received training signal.

20. The method of claim 18, wherein applying the determined phase shift to the signal includes adjusting at least one of coefficients and order of the at least one all-pass FIR filter.

* * * * *